United States Patent [19]

Rake et al.

[11] 4,022,153
[45] May 10, 1977

[54] APPARATUS FOR SEALING A CABLE CORE WITH WATERPROOFING COMPOUND

[75] Inventors: Robert Wayne Rake, Phoenix; Albert Sanford Tingley; Thomas Arthur Walter, both of Glendale, all of Ariz.

[73] Assignee: Western Electric Company, Inc., New York, N.Y.

[22] Filed: Sept. 19, 1975

[21] Appl. No.: 615,022

Related U.S. Application Data

[62] Division of Ser. No. 446,056, Feb. 26, 1974, abandoned.

[52] U.S. Cl. .................................. 118/68; 118/69; 118/405; 118/DIG. 18
[51] Int. Cl.² ..................... B05C 3/15; B05C 11/04
[58] Field of Search ................. 156/47, 48, 49, 50, 156/51; 118/69, 404, 405, 420, 50.1, DIG. 11, DIG. 18, DIG. 19, 68

[56] References Cited

UNITED STATES PATENTS

| | | | |
|---|---|---|---|
| 1,681,566 | 8/1928 | Anderegg | 118/DIG. 18 |
| 2,175,099 | 10/1939 | Abbott | 118/405 X |
| 3,733,216 | 5/1973 | Goldman et al. | 118/405 X |
| 3,767,454 | 10/1973 | Frank, Jr. et al. | 156/48 X |

OTHER PUBLICATIONS

Vacuum–Pressure Impregnation of Waterproofing Cable, (Western Electric Engng., vol. 15, No. 3, July–Oct. 1971), 118–150.

*Primary Examiner*—Dorsey Newton
*Attorney, Agent, or Firm*—A. C. Schwarz, Jr.

[57] ABSTRACT

A cable core, the interstitial spaces within which are being filled with waterproofing compound in a semi-fluid state as it passes through a compound-applying or filling chamber into which the compound is introduced under pressure, is advanced through a wiping die in a constricted passageway and into another chamber into which similar compound is pumped. The compound in the second chamber is at a substantially lower temperature than the compound in the filling chamber and exerts pressure radially on the cable core being filled to form a sheath or coating of the lower temperature compound around the filled core to seal the first compound in the core. The core is thereafter passed through a sizing die into a cooling chamber which solidifies the compound in and around the core. The cable core is thus conditioned for the subsequent application of sheathing materials thereto, for example, core wrapping and/or armor sheathing.

5 Claims, 6 Drawing Figures

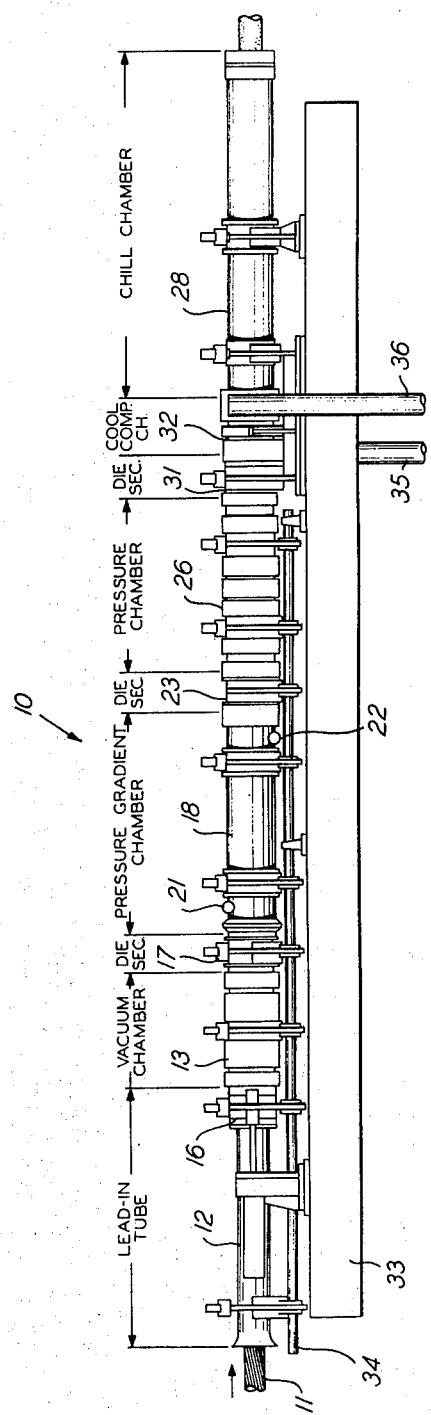
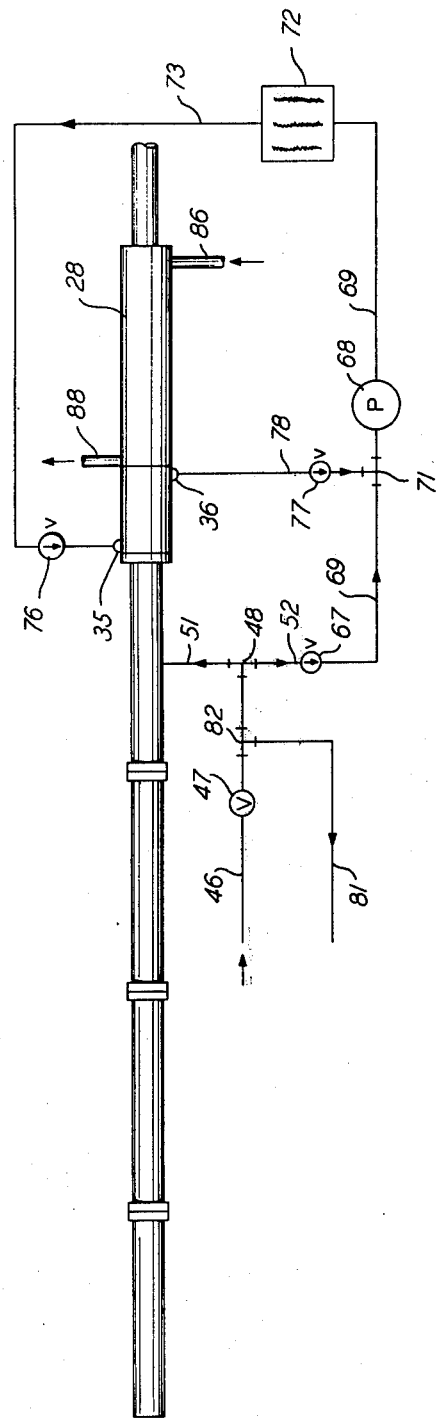
FIG. 1
FIG. 2

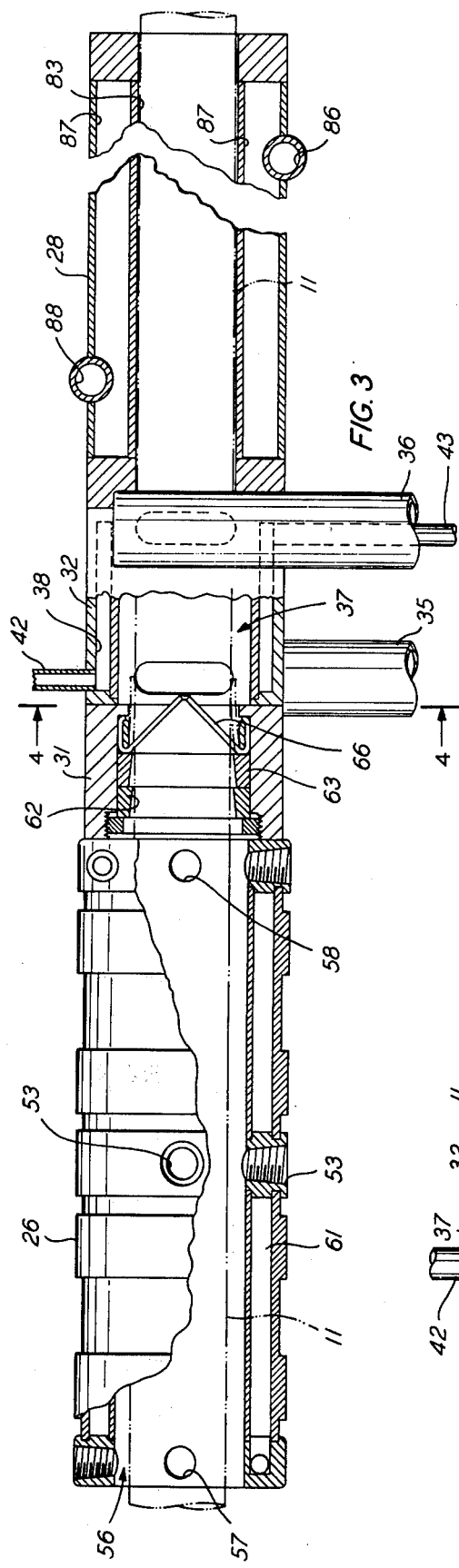
FIG. 3
FIG. 4
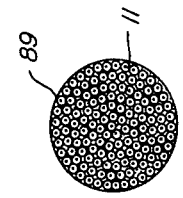
FIG. 5
FIG. 6

APPARATUS FOR SEALING A CABLE CORE WITH WATERPROOFING COMPOUND

The instant application is a division of application Ser. No. 446,056, filed on Feb. 26, 1974, now abandoned.

BACKGROUND OF THE INVENTION

1. Field of the Invention

The present invention relates to apparatus for manufacturing waterproof cable, and more particularly, to a for filling the interstitial voids of a cable core with a waterproofing compound and sealing the compound in and around the cable core.

2. Background and Prior Art

In the manufacture of communications cable, and more particularly, the manufacture of cables intended to be buried beneath the ground, it is desirable practice to fill the interstitial spaces between the insulated conductors of the core as well as other portions of the cable to prevent the ingress of moisture into the cable core.

One method and apparatus for filling a cable core is disclosed in E. L. Franke, Jr. et al. U.S. Pat. No. 3,767,454, the entire disclosure of which is hereby specifically incorporated by reference. The Franke, Jr. et. at. system disclose a technique whereby a cable core having stranded twisted pairs of insulated elongated conductors is moved longitudinally through a series of in-line chambers having interconnecting dies to facilitate the evacuation of air from voids in the interstitial structure of the core and the pressure application of a waterproofing compound of jelly-like consistency into the air evacuated voids. Thereafter, the compound filled cable core may be passed through various stations where core wrap and sheathing materials are placed about the core in combination with additional applications of the waterproofing compound. A plastic jacket is extruded about the sheathing and is cooled prior to takeup of the jacketed cable onto a reel.

In the application of the core wrap and sheathing materials to a cable core filled with waterproofing compound in accordance with the Franke, Jr. et al. disclosure, among other techniques, it has been found that the cross-sectional outer or peripheral contour of the filled cable core is irregular. When a core wrap is applied thereto, it must conform closely to the irregular contour of the cable core in order to avoid creating voids between the periphery of the cable core and the subsequently applied core wrap. These voids can be minimized by utilizing a supple and easily formable core wrap material, for example, a core wrap formed from randomly arranged nonhygroscopic fibers of the type disclosed and claimed in R. S. Elliott U.S. Pat. No. 3,509,269. However, though the use of an easily formable core wrap minimizes the creation of any voids between the core wrap and the cable core, it does not avoid them completely.

Furthermore, the combination of a cable core enclosed in a highly formable core wrap, has an irregular peripheral contour, making it difficult to form an armor sheath, for example, a sheath of corrugated aluminum orsteel, in water tight relationship about the cable core and the core wrap. As a result, the finished cable may not be completely impervious to water ingress and migration.

L. D. Moody U.S. Pat. No. 3,733,255 teaches passing a wrapped cable core having an irregular peripheral contour longitudinally through an elongated forming tube in which an armor armor sheath is formed about the core and introducing jelly-like waterproofing compound into the forming tube at a point spaced from its entrance end and under relatively high pressure to produce a waterproof layer of the compound which coats the wrapped core and provides a smooth cylindrical surface about which the sheath can be formed as the wrapped cable core assembly exits from the forming tube. The pressure at which the compound is introduced into the forming tube forces the compound between the overlapped edged portions of the sheath to seal and waterproof the seam formed by the edge portions. This method, however, does not insure the absence of voids or air pockets between the core wrap and the filled cable core.

SUMMARY OF THE INVENTION

One object of the invention is to provide a new and improved apparatus for applying a waterproofing jelly-like compound to an elongated strand.

Another object of the present invention is to provide a new and improved apparatus for sealing a cable core filled with waterproofing jelly-like compound.

A further object of the present invention is to provide a new and improved apparatus for providing a waterproof cable construction having an improved percent fill over prior art waterproof cable constructions.

An apparatus for applying a compound to a stranded article, in accordance with the principles of the present invention, may include means for applying compound in a substantially fluent state under pressure to successive portions of the stranded article, means for applying further compound in a substantially viscous state under pressure into contact with successive portions of the article to coat and seal the fluent compound therein and means for cooling the article to solidify the applied compounds.

BRIEF DESCRIPTION OF THE DRAWINGS

A complete understanding of the present invention may be obtained from the following detailed description of a preferred embodiment thereof, when read in conjunction with the accompanying drawings, wherein:

FIG. 1 is an elevational view of an overall apparatus for injecting and sealing a waterproofing compound in the interstices of and around a cable core in accordance with the princiiplies of the present invention;

FIG. 2 is a schematic illustration of a plan view of the improvement forming part of the apparatus of FIG. 1 embodying the principles of the present invention;

FIG. 3 is a detailed illustration, partly in section, of part of the apparatus of FIG. 2;

FIG. 4 is a sectional view of the apparatus of FIG. 3 taken along the line 4—4 thereof;

FIG. 5 is a sectional view of a cable core filled in accordance with the principles of the prior art; and FIG. 6 is a sectional view of a cable core filled in accordance with the principles of the present invention.

DETAILED DESCRIPTION

Referring to FIG. 1, there is shown an apparatus 10 for injecting and sealing a waterproofing compound into and around the interstics of a cable core 11 passed therethrough longitudinally.

The apparatus 10 preferably includes a lead-in tube 12 connected to one or more vacuum chambers 13 through a constrictor section or die 16 where the interstitial voids in the core 11 are substantially evacuated.

The core 11 is thereafter passed through a die 17 and a pressure gradient or insulated cooling chamber 18, which may have a cooling medium, for example, water circulated threraround through an inlet 21 and an outlet 22. Under some operating conditions, it may be found desirable to circulate a heating medium instead.

After the pressure gradient chamber 18, the core 11 is passed through a die 23 into a compound-applying or pressure chamber 26 where substantially fluent waterproofing compound is injected under pressure, for example, 20 p.s.i., into the evacuated voids in the cable core 11. The temperature of the compound in the filling chamber 26 may vary between 100°–300° F for a compound having a mixture of petrolateum or petroleum jelly in the range of 80–93% by weight and low density polyethylene in the range of 2–20%, by weight but is preferably in the range of 200°–230° F for a mixture of 92% by weight patrolatum or petroleum jelly and 8% by weight low density polyethylene. If, instead, a single component compound of petrolatum is used, the temperature may be in the range of 100°–250° F, but preferably in the range of 170°–200° F.

The apparatus 10 as thus far described in substantially identical to the apparatus disclosed in E. L. Franke, Jr. et al. U.S. Pat. No. 3,767,454. In the Franke et al. apparatus, it is taught that the core 11 then passes into a temperature-gradient chamber and then to a cooling or chill chamber 28 through a suitable constrictor section or die where a successive sections of the core 11 are cooled and become somewhat solidified to the extent that the compound therein does not flow but has assumed a jelly-like consistency to permit the compound to be retained in the core 11 as the core exists from the downstream end of the chill chamber 28 into the atmosphere.

The apparatus described above has been modified, in one respect, to eliminate the vacuum in the vacuum chamber 13. By doing this, the hot compound in the pressure chamber 26 is permitted to flow, counter to the direction of travel of the cable core, through the pressure gradient chamber 18 and into the non-operating vacuum chamber 13. Any excess compound in the chamber 13 is bled therefrom through an aperture (not shown) in the bottom of the chamber 13 to a collection tank (not shown) from which it is then pumped into the main supply of compound for the system.

The elimination of the vacuum in the chamber 13 has the effect of increasing the overall length, and thus the period of time, under which the cable core 11 is under pressure of the waterproofing compound and also serves to preheat the core 11 in its travel toward the pressure chamber 26, without adversely effecting the vacuum system.

In a further modification thereto, and in accordance with the principles of the present invention, there is provided between the filling chamber 26 and the chill chamber 28, a die 31 and a cool compound chamber 32.

As will be understood from the description below, the combination of the die 31 and the cool compound chamber 32 provides an improved percent fill of the evacuated voids in the core 11 and, in addition, seals the filling compound into the core 11 without relying on the chill chamber 28 to cool the compound. Furthermore, the core 11 is better conditioned for the subsequent application of core wrapping material thereon, improving the peripheral contour of the core 11, eliminating irregularities therearound and the attendant possibility of voids between the filled core 11 and the core wrapping material.

As shown in FIG. 1, the apparatus 10 may be supported on a base 33, either individually or through a pair of parallel rods 34 onto which various sections or chambers of the apparatus 10 may be adjustably clamped.

Referring to FIGS. 2–4, the cool compound chamber 32 includes an inlet conduit 35 and an outlet conduit 36 communicating with a passageway 37 for receiving the cable core 11. Cool waterproofing compound, identical to the mixture of petrolateum and low density polyethylene of the filling compound but at a lower temperature, for example, 60°–170° F, but preferably 130°–160° F, and substantially at the same pressure as in chamber 26, for example, 20 p.s.i., is introduced into the passageway 37 in a substantially viscous state. If a single component compound of petrolateum is used, the temperature should be in the range of 110°–140° F.

Cool water, for example, at a temperature of 55° F, is continuously circulated through a chamber 38 flowing through an inlet pipe 42 and an outlet pipe 43 communicating therewith, to maintain the temperature stability of the compound in the cool compound chamber 32.

As shown in FIG. 2, the higher temperature compound is pumped into a conduit 46 through a valve 47 into a T-fitting 48 connected into a conduit 51 and a conduit 52. As shown in FIG. 3, the conduit 51 may communicate with one or more openings 53 in the filling chamber 26 to inject the compound therein to fill the interstitial voids in the cable core 11. Excess compound exits the filling chamber 26 through a passageway 56 formed in the chamber 26 for receiving the higher temperature compound under pressure and may pass through the pressure gradient chamber 18 and the vacuum chamber 13 from which it exists. Apertures 57 and 58 are provided for instrumentation purposes, not shown, such as for instance; to measure and monitor pressure and temperature.

The chamber 26 is preferably provided with an annular chamber 61 for circulating steam to maintain the temperature stability of the higher temperature coupound.

The die section 31 is interposed between the filling chamber 26 and the cool compound chamber 32. The die section 31 includes first and second metal wiping dies 62 and 63 and a resilient die 66, which is preferably formed from a frusto-conical rubber element; as an alternative the resilient die 66 may be replaced by a metal wiping die, such as die 63.

As the cable core 11 is advanced through the filling chamber 26, through the die section 31 and into the cool compound chamber 32, the lower temperature compound in the cool compound chamber 32 coats the core 11 with a laminate of waterproofing compound. Similarly, as the cable core 11 passes into the cooling chamber 32 through the die section 31, the pressure in the chamber 32 will cause the resilient die 66 to engage the cable core 11, tending to further urge the hot compound into the interstices of the core 11.

As shown in FIG. 2, a valve 67 interposed in the conduit 52 controls, at start-up, the amount of waterproofing compound advanced to a pump 68 in a conduit 69 through a T-fitting 71. The compound is pumped through a heat exchanger 72, in a conduit 73, which abstracts sufficient heat from the compound to cool it to the desired temperature, introducing it into the inlet 35 of the cool compound chamber 32 through a valve 76. The cool compound exiting the outlet 36 of the cool compound chamber 32 is returned to the conduit 69 through a valve 77 in a conduit 78. A pressure relief conduit 81 may be fitted to the conduit 46 through a T-fitting 82.

After the system and equipment are operating, the valve 67 is closed. At this time, none of the hot compound from the conduit 46 is advanced to the pump 68, but instead, the pump 68 circulates compound in the conduits 69, 73 and 78. The operation of the pump 68 will also cause compound from the pressure chamber 26 to be drawn through the die section 31 and into the cool compound chamber 32, a portion of which will be drawn off through the exiting conduit 78, for recirculation. There is not sufficient hot compound entering the cool compound chamber 32 to adversely affect the desired result, namely, the coating of the cable core 11 with a laminate of waterproofing compound.

After the core 11 exits the cool compound chamber 32, it enters the cooling or chill chamber 28, advancing through a passageway 83 therethrough which is maintained at a temperature, for example, 55° F, to cool and solidify both applications of compound to a putty-like consistency by circulating cold water through an inlet 86 into a circumferential passageway 87 and out an outlet 88.

The exit portion of the chill chamber 28 may be fitted with a suitable sizing die to provide a smooth peripheral contour 89 to the cable core 11 as shown in FIG. 6.

Referring to FIGS. 5 and 6, there are shown, respectively, for comparison, a prior art filled cable core 11 (FIG. 5) and a cable core 11 (FIG. 6), filled and sealed in accordance with the principles of the present invention.

As shown in FIG. 6, the present apparatus provides a sheath or coating 89 of waterproofing compound around the cable core 11 to condition it for the subsequent application of a core wrapping material and suitable armor sheathing, the latter, preferably in accordance with the teachings of the L.D. Moody patent, referred to previously.

The cable core 11 may be preheated in a drying apparatus or the like, to prevent its acting like a heat sink for the filling compound prior to entry into the apparatus 10.

It will be appreciated that various modifications and improvements of the foregoing described invention will be obvious to those having ordinary skill in the art which come within the spirit and scope of the invention as defined in the annexed claims.

What is claimed is:

1. An apparatus for applying a waterproofing compound to a cable core consisting of a plurality of stranded conductors having interstics therebetween, which comprises:
   at least first and second chambers for receiving the waterproofing compound;
   means for maintaining a portion of said compound in a substantially viscous state;
   means for applying said portion of said compound in said substantially viscous state under pressure above atmospheric to successive portions of the advancing cable core to impregnate the same;
   means for maintaining additional of said compound in a substantially more viscous state than said previous compound;
   means for applying said additional compound in said second chamber over said previous compound while still viscous in said substantially more viscous state than said previous compound under pressure above atmosphere into contact with successive portions of the advancing impregnated cable core to coat, fill any voids and seal said previous viscous compound from said first chamber therein; and
   means for cooling the advancing cable core subsequent to both applications of compound to substantially solidify the applied compounds.

2. An apparatus as set forth in claim 1 wherein means are provided for diverting a portion of the first applied compound from said first chamber to said second chamber and heat exchanger means are provided for abstracting heat from the diverted first applied compound.

3. An apparatus as set forth in claim 1 and including a flexible die connecting said first compound applying chamber with said second compound applying chamber wherein the pressure of the second compound without said die forces said die inward around the cable core to force the first applied compound within said die into the interstices within the cable core.

4. The apparatus of claim wherein the waterproofing compound is a single component compound of petrolatum, and further including means for maintaining compound in said first chamber in the temperature range of 170° – 200° F, and including further means for maintaining the temperature of said additional compound in said second chamber in the temperature range of 110° – 140° F.

5. An apparatus as set forth in claim 1, wherein the compound is a mixture of petrolatum and low density polyethylene, and further including means for maintaining said first applied compound in said first chamber in the temperature range of 200° – 230° F, and including further means for maintaining the temperature of said additional applied compound in said second chamber in the temperature range of 130° – 160° F.

* * * * *